United States Patent
Kaltner et al.

(10) Patent No.: US 9,690,468 B2
(45) Date of Patent: Jun. 27, 2017

(54) INTERACTIVE MEDIA PRESENTATIONS USING A PLURALITY OF SELECTABLE AUDIO ELEMENTS

(71) Applicant: Content Maker, Inc., Mount Vernon, NY (US)

(72) Inventors: George Kaltner, Scarsdale, NY (US); Maxim Doumkine, Brooklyn, NY (US)

(73) Assignee: CONTENT MAKER, INC., Mount Vernon, NY (US)

( * ) Notice: Subject to any disclaimer, the term of this patent is extended or adjusted under 35 U.S.C. 154(b) by 102 days.

(21) Appl. No.: 14/449,389

(22) Filed: Aug. 1, 2014

(65) Prior Publication Data
US 2016/0034160 A1 Feb. 4, 2016

(51) Int. Cl.
G06F 3/0484 (2013.01)
H04L 29/06 (2006.01)

(52) U.S. Cl.
CPC ...... *G06F 3/04847* (2013.01); *G06F 3/04842* (2013.01); *H04L 65/1069* (2013.01)

(58) Field of Classification Search
None
See application file for complete search history.

(56) References Cited

U.S. PATENT DOCUMENTS

| | | | |
|---|---|---|---|
| 4,333,152 A * | 6/1982 | Best | A63F 13/00 345/473 |
| 5,358,259 A * | 10/1994 | Best | A63F 13/005 463/31 |
| 6,722,989 B1 | 4/2004 | Hayashi | |
| 7,478,047 B2 | 1/2009 | Loyall et al. | |
| 8,595,216 B2 | 11/2013 | Harris | |
| 2013/0002532 A1* | 1/2013 | Raffle | G06F 3/1423 345/156 |
| 2013/0226588 A1 | 8/2013 | Irmler et al. | |
| 2014/0191976 A1* | 7/2014 | Peevers | A63F 13/10 345/173 |

* cited by examiner

*Primary Examiner* — Asher Kells
(74) *Attorney, Agent, or Firm* — Fox Rothschild LLP

(57) ABSTRACT

A method of providing an interactive media presentation may include, by an electronic device, receiving, from a user electronic device, an indication that an interactive portion of a media presentation is about to begin, and causing a graphical representation of a conversation atlas to be displayed. The conversation atlas may include a plurality of selection elements that are each associated with an audio element for a character that is featured in the interactive portion. The method may include receiving a user response comprising conversational information received from a user that is directed to a character of the media presentation, in response to receiving the user response, receiving a selection of at least one of the plurality of selection elements of the conversation atlas, identifying the audio element that corresponds to the selected selection element, and causing the identified audio element to be presented at the user electronic device.

21 Claims, 13 Drawing Sheets

INTERACTIVE MEDIA PRESENTATIONS USING A PLURALITY OF SELECTABLE AUDIO ELEMENTS

BACKGROUND

This disclosure is generally directed to methods and systems of interactive entertainment, and more specifically to methods and systems of providing realistic conversation and interaction between a human viewer and a story character or personality.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of providing an interactive media presentation may include, by an electronic device, receiving, from a user electronic device, an indication that an interactive portion of a media presentation is about to begin, and causing a graphical representation of a conversation atlas to be displayed to an embodier. The conversation atlas may include a plurality of selection elements that are each associated with an audio element for a character that is featured in the interactive portion. The method may include receiving, from the user electronic device, a user response comprising conversational information received from a user that is directed to a character of the media presentation, in response to receiving the user response, receiving, from the embodier, a selection of at least one of the plurality of selection elements of the conversation atlas, identifying the audio element that corresponds to the selected selection element, and causing the identified audio element to be presented at the user electronic device.

In an embodiment, a system of providing an interactive media presentation may include an electronic device and a computer-readable storage medium in communication with the electronic device. The computer-readable storage medium may include one or more programming instructions that, when executed, cause the electronic device to receive, from a user electronic device, an indication that an interactive portion of a media presentation is about to begin, and cause a graphical representation of a conversation atlas to be displayed to an embodier. The conversation atlas may include a plurality of selection elements that are each associated with an audio element for a character that is featured in the interactive portion. The computer-readable storage medium may include one or more programming instructions that, when executed, cause the electronic device to receive, from the user electronic device, a user response. The user response may include conversational information received from a user and the conversational information may be directed to a character of the media presentation. The computer-readable storage medium may include one or more programming instructions that, when executed, cause the electronic device to in response to receiving the user response, receive, from the embodier, a selection of at least one of the plurality of selection elements of the conversation atlas, identify the audio element that corresponds to the selected selection element, and cause the identified audio element to be performed at the user electronic device.

DETAILED DESCRIPTION

Figure 1:
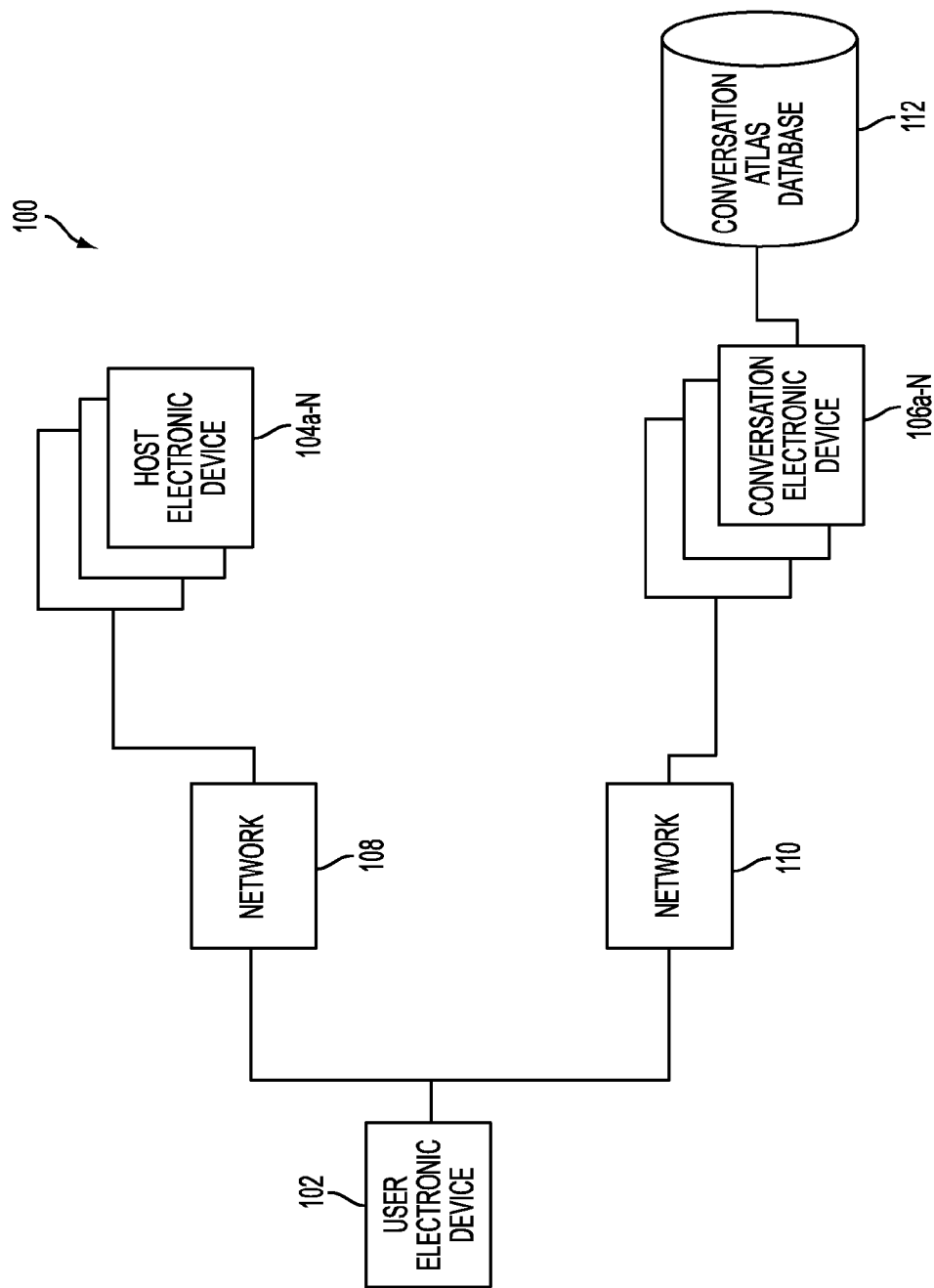
FIG. 1 illustrates an example interactive system according to an embodiment.

The following terms shall have, for purposes of this application, the respective meanings set forth below:

An "audio element" refers to audio data that includes a particular comment, question, statement, remark, word, sentence, phrase, other verbal expression and/or other sound that is associated with a character of a media presentation.

A "conversation atlas" refers to a graphical user interface that includes one or more selection elements that are each associated with one or more audio elements and/or one or more visual elements of a media presentation. In certain embodiments, a conversation atlas may be particular to one or more characters of a media presentation.

An "electronic device" refers to a device that includes a processor and tangible, computer-readable memory. The memory may contain programming instructions that, when executed by the processor, cause the electronic device to perform one or more operations according to the programming instructions. Examples of electronic devices include personal computers, servers, mainframes, gaming systems, televisions, and portable electronic devices such as smartphones, personal digital assistants, cameras, tablet computers, laptop computers, media players and the like. When used in the claims, reference to "an electronic device" may include a single device, or it may refer to any number of devices having one or more processors that communicate with each other and share data and/or instructions to perform the claimed steps.

An "embodier" refers to an individual operator of a conversation electronic device.

An "interactive portion" refers to a portion of a media presentation during which one or more users are able to interact with one or more characters of the media presentation.

A "media presentation" refers to an electronic presentation of visual and/or audio information. In various embodiments, at least a portion of a media presentation may include one or more audio and/or visual elements. For example, a media presentation may include a variety of animation sequences, videos, pictures, images, graphics, dialogue, sound effects and/or the like. Example media presentations may include, without limitation, a movie, a video game, an electronic book, or other electronic presentation of information. A media presentation may be used as part of an entertainment experience, an educational experience, a presentation and/or the like.

A "selection element" refers to a graphical interface element that represents certain information. Example selection elements may include, without limitation, buttons, drop down menus, radial buttons, hyperlinks, and/or the like.

A "static portion" refers to a non-interactive portion of a media presentation.

A "visual element" refers to data associated with a visual component of a media presentation. Example visual elements may include, without limitation, animation, animation sequences, videos, pictures, images, graphics and/or the like.

In various embodiments, a user may access a media presentation using an electronic device. A media presentation may tell a story and may include one or more characters. The characters may be fictional or may be representations of real personalities. In an embodiment, a media presentation may include one or more static portions and/or one or more interactive portions. A static portion may refer to an audio and/or visual presentation during which a user is not able to interact with one or more characters of the media presentation.

An interactive portion may refer to an audio and/or visual presentation during which a user is able to interact with one or more characters of the media presentation. For example, a user may have a conversation with one or more characters during an interactive portion of a media presentation. The user may speak to the character, and the character may respond, and vice versa. The character may respond in the characters own voice and in a manner that is natural to the conversation that is being had. In certain embodiments, the character's visual demeanor and/or depiction may be consistent with what the character is saying or how the character responds to what a user says.

FIG. 1 illustrates an example interactive system according to an embodiment. As illustrated by FIG. 1, a system 100 may include a user electronic device 102, one or more host electronic devices 104a-N and one or more conversation electronic devices 106a-N. A user electronic device 102 may be in communication with one or more of the host electronic devices 104a-N and/or the conversation electronic devices 106a-N via one or more networks 108, 110. A network 108, 110 may be a local area network (LAN), a wide area network (WAN), a mobile or cellular communication network, an extranet, an intranet, the Internet and/or the like.

In various embodiments, a user electronic device 102 may be used to access a media presentation from a host electronic device 104a-N. A user electronic device 102 may download a media presentation from a host electronic device 104a-N. In an alternate embodiment, a user electronic device 102 may stream or otherwise access a media presentation from a host electronic device 104a-N.

In certain embodiments, a conversation electronic device 106a-N may communicate with a user electronic device to facilitate interactive portions of media presentation. As illustrated by FIG. 1, a conversation electronic device 106a-N may be in communication with a conversation atlas database 112. A conversation atlas database 112 may store character information that is pertinent to one or more characters of one or more media presentations.

In various embodiments, character information may include one or more audio elements. A voice actor or other person speaking in the voice of the character may record scripted questions, words, phrases, comments, remarks, statements, sound effects or other sounds, which may be used to create one or more audio elements. Each audio element may be specific to a character and/or a media presentation. For instance, one or more audio elements associated with a character in one media presentation may differ from one or more audio elements associated with the same character in a different media presentation. In some embodiments, character information may include sound effects, music, images, videos and/or the like.

Figure 2:
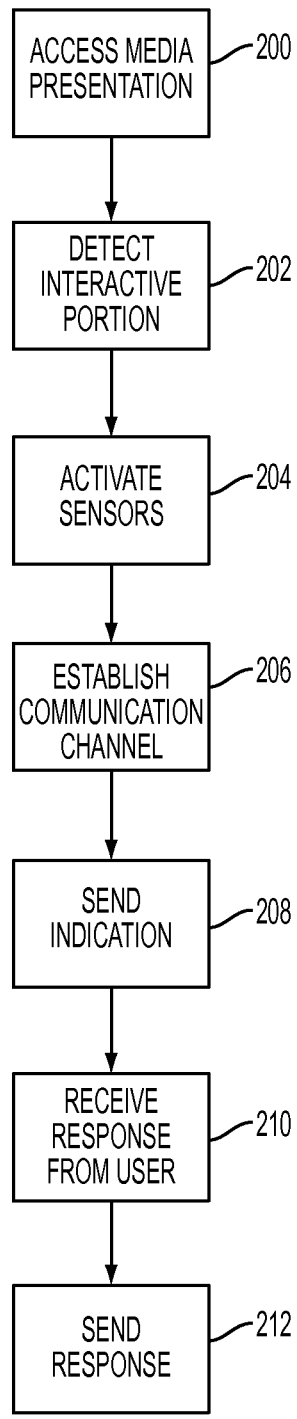
FIG. 2 illustrates an example method of providing an interactive experience according to an embodiment.

FIG. 2 illustrates an example method of providing a media presentation according to an embodiment. As illustrated by FIG. 2, a user electronic device may access 200 a media presentation. A user electronic device may access 200 a media presentation by downloading the media presentation from a website, content store or other electronic device, and accessing the media presentation using the user electronic device. In other embodiments, a user electronic device may access 200 a media presentation by streaming or otherwise accessing the media presentation from a remote electronic device.

A user electronic device may cause the media presentation to be displayed to a user. As illustrated by FIG. 2, as the media presentation progresses, a user electronic device may detect 202 an interactive portion of the media presentation. In certain embodiments, a user electronic device may detect that an interactive portion is about to begin. An interactive portion may be a portion of a media presentation during which a user can interact with a character in the media presentation. Interacting with a character may involve a user having a verbal conversation with one or more characters of the media presentation, a character reacting to a verbal comment, question, statement and/or the like made by the user, a character reacting to an action or non-action of a user, a character verbally responding to a comment, question, statement and/or the like of a user, and/or the like.

For example, a story being told by the media presentation may be temporarily stopped to allow a user to have a conversation with a character. In certain embodiments, an interactive portion may allow a user to ask a character one or more questions, such as questions pertaining to the story. In various embodiments, an interactive portion may be used to receive feedback from a user. For example, a story may include a plotline where a main character becomes trapped. During an interactive portion, the main character may ask the user to suggest ways for the character to escape. Additional and/or alternate interactive portion scenarios may be used within the scope of this disclosure.

During the interactive portion, a character may speak to a user in the character's own voice or in the voice that the character spoke during the non-interactive portions of the media presentation. For example, if the character is a known cartoon character or other personality, the character may speak to a user in the character's known and recognizable voice. Similarly, if the character is a representation of an actual person, the character may speak in a similar voice of the actual person. For instance, a character in a media presentation may be George Washington. The character may speak in a voice that mimics George Washington's voice.

A media presentation may include any number of interactive portions and/or static portions. In certain embodiments, the existence and placement of interactive and/or static portions in a media presentation may be defined by a creator of the media presentation. For instance, a media presentation creator may determine where in a media presentation an interactive portion should occur. In certain embodiments, a user electronic device may detect 202 an interactive portion by recognizing a particular script or script defined element, code or other instructions being executed by the media presentation. In an embodiment, a user electronic device may detect 202 an interactive portion based on one or more audio cues from one or more characters, scenes and/or the like of a media presentation. For instance, a character may say something to invite the user to click on a phone booth or ringing phone booth, which may begin an interactive portion.

In other embodiments, a user may be provided one or more opportunities to initiate an interactive portion during the course of a media presentation. A user may initiate an interactive portion by inputting one or more instructions into the user electronic device. For instance, a user may press one or more selection elements on the user electronic device or a remote control for the user electronic device, such as one or more buttons or keys, to initiate an interactive portion. As another example, a user may speak one or more commands to the user electronic device to initiate an interactive portion. The user electronic device may receive one or more instructions from a user, and may detect 202 the interactive portion based on the instructions.

In response to detecting an interactive portion, a user electronic device may activate 204 one or more sensors of the user electronic device. A sensor may be any device or component of a user electronic device that is capable of receiving information from the user or the user's environment. Example sensors may include, without limitation, a camera and a microphone.

In response to detecting an interactive portion, a user electronic device may establish 206 a communication channel with one or more conversation electronic devices. In an embodiment, a user electronic device may establish 206 a communication channel with one or more conversation electronic devices over a network. Example networks may include, without limitation, the Internet, voice-over Internet protocol (VoIP), network-based peer-to-peer connections, telephone calls and/or the like.

In certain embodiments, a conversation electronic device may be used by an individual operator referred to in this disclosure as an embodier. When a communication channel is established 206 between a user electronic device and a conversation electronic device, a conversation electronic device may be able to access one or more of the user electronic device's sensors. For instance, an embodier may be able to hear what the user is saying via a user electronic device microphone, or may be able to see the user via a front facing camera of the user electronic device. However, a user may not be able to see and/or hear the embodier.

In various embodiments, a user may be notified that a communication channel is about to be established. The user may be required to agree to establish a communication channel before the channel is opened.

In an embodiment, a user electronic device may send 208 an indication that an interactive portion of a media presentation is about to begin to a conversation electronic device. The indication may include an identifier associated with the detected interactive portion. For instance, if a media portion includes three interactive portions, each interactive portion may be associated with an identifier that uniquely identifies the interactive portion.

Figure 3:
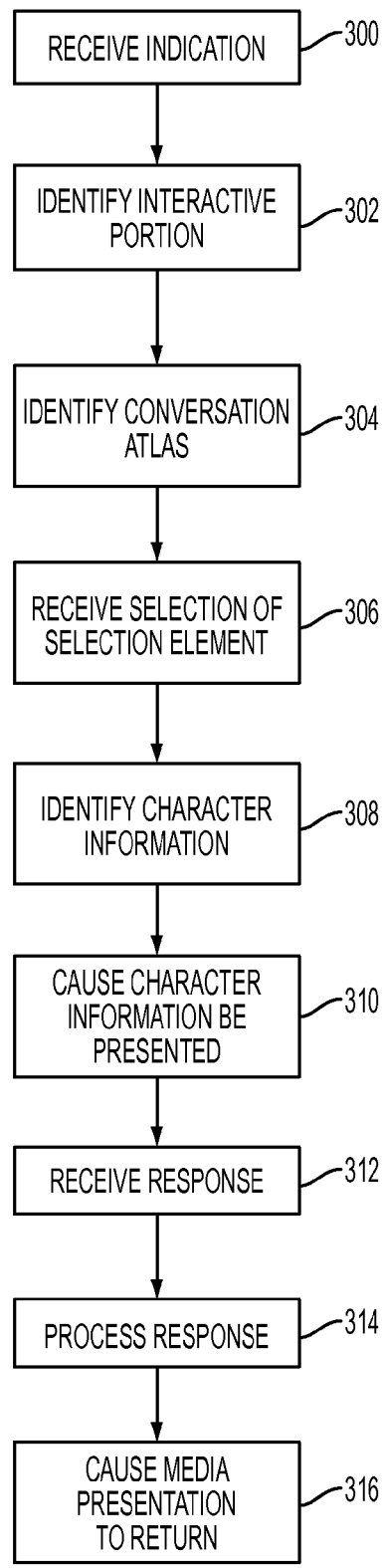
FIG. 3 illustrates an example method of a conversation electronic device providing an interactive experience according to an embodiment.

FIG. 3 illustrates an example method of a providing a media presentation according to an embodiment. As illustrated by FIG. 3, a conversation electronic device may receive 300 an indication from a user electronic device that an interactive portion of a media presentation is about to begin. The conversation electronic device may use the identifier of the received indication to identify 302 which interactive portion is about to begin. For example, a conversation electronic device may maintain or be in communication with a database of identifiers and interactive portion information. Interactive portion information may include, without limitation, a name or title of a corresponding media presentation, one or more characters with whom a user can interact during the interactive portion and/or the like. Table 1 illustrates an example database of interactive portion information according to an embodiment.

TABLE 1

| Identifier | Media Presentation Title | Character |
| --- | --- | --- |
| 13902 | The Invasion | Alien King |
| 40385 | All of the Presidents | George Washington |

As illustrated by Table 1, if a conversation electronic device receives an indication that an interactive portion associated with Identifier 40385 is about to begin, the conversation electronic device may identify the interactive portion as part of a media presentation entitled "All of the Presidents" that involves a George Washington character.

In an embodiment, a conversation electronic device may identify 304 a conversation atlas that corresponds to the identified interactive portion. For example, a conversation electronic device may use the identifier, the media presentation title and/or the character to identify 304 a corresponding conversation atlas for the identified interactive portion.

Figure 4:
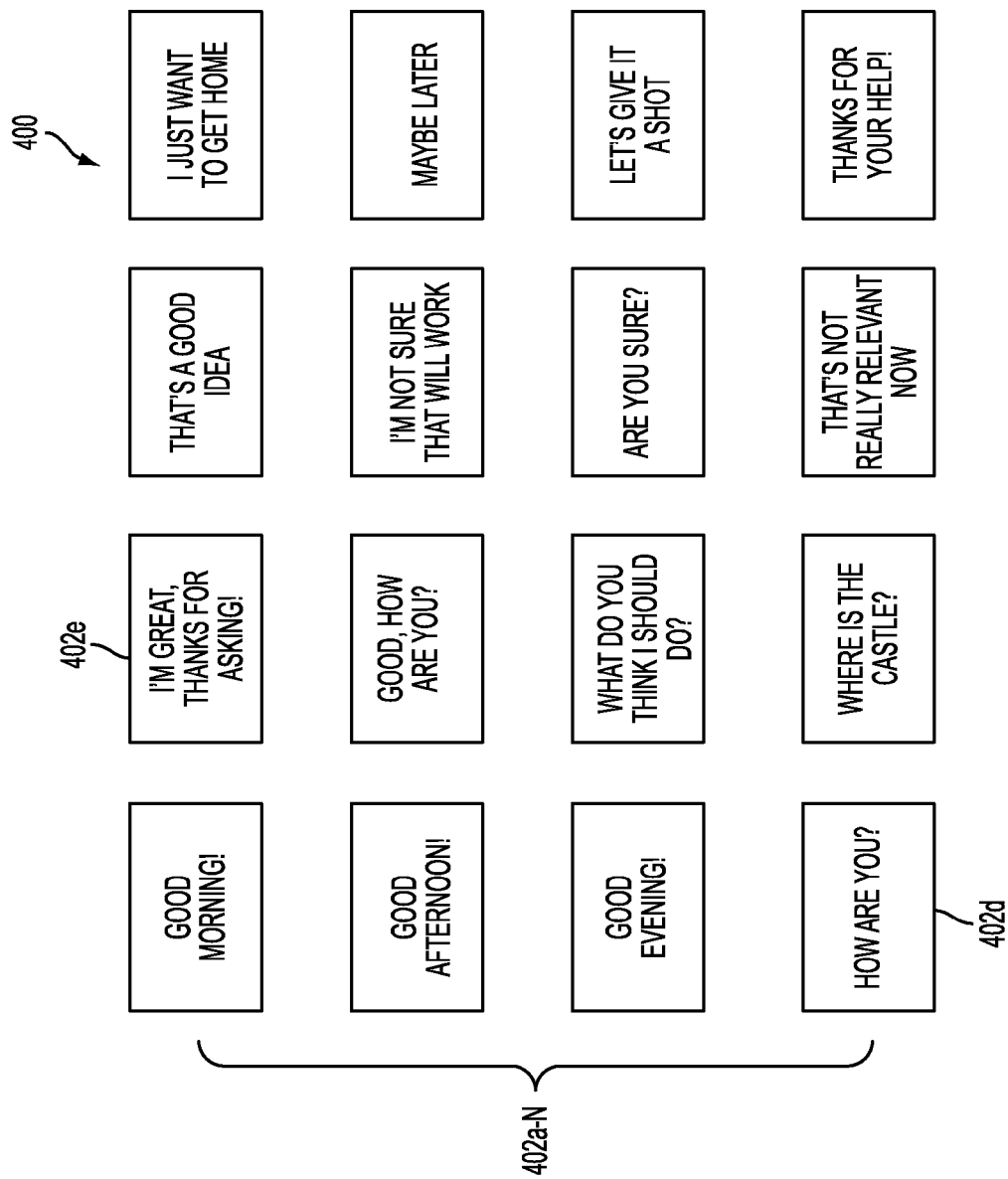
FIG. 4 illustrates an example conversation atlas according to an embodiment.

A conversation atlas may be a graphical user interface that includes one or more selection elements that are each associated with character information. An audio element may be a particular comment, question, statement, remark, verbal expression or sound that is associated with a character. FIG. 4 illustrates an example conversation atlas according to an embodiment. As illustrated by FIG. 4, a conversation atlas 400 may include one or more selection elements 402*a*-N which may each correspond to an audio element or other item of character information.

In certain embodiments, each interactive portion of a media presentation may be associated with one or more conversation atlases. A conversation atlas may be specific to a character of a media presentation, and may be specific to a particular interactive portion. For instance, a conversation atlas for a character in a first interactive portion of a media presentation may differ from a conversation for the same character in a second interactive portion of the media presentation.

In various embodiments, a conversation electronic device may receive 306 a selection of one or more selection elements of an identified conversation atlas. A conversation electronic device may receive 306 a selection from a user via an input device or mechanism associated with the conversation electronic device. For example, a conversation electronic device may receive a selection from a user via a touchscreen, a mouse, a keyboard, a spoken command and/or the like. In an embodiment, a conversation electronic device may receive 306 a selection of one or more selection elements from an embodier. In other embodiments, a conversation electronic device may automatically make a selection of information that is associated with one or more selection elements of a conversation atlas.

In response to receiving 306 a selection, the conversation electronic device may identify 308 character information associated with the selected selection element. In certain embodiments, a conversation electronic device may use a table, list or other mapping to correlate a selection element with character information. A conversation electronic device may identify 308 an appropriate item of character information from a conversation atlas database. In various embodiments, character information may be stored in a conversation atlas database, and may be associated with a media presentation, a character, an interactive portion of a media presentation and/or the like. A conversation electronic device may use the particular media presentation, the character, the particular interactive portion and the received selection to identify 308 the correct item of character information from the conversation atlas database.

In an embodiment, a conversation electronic device may cause 310 the retrieved item of character information to be presented at the user electronic device. In certain embodiments, a visual representation of a character may be displayed to a user on a user electronic device during an interactive portion. If the character information includes an audio element, the conversation electronic device may cause 310 the selected audio element to be played such that it appears that the character is speaking. For instance, the character may move his, her or its mouth, or make other gestures that correspond to the audio being played. As an example, a conversation electronic device may receive a selection of button 402d. In response, the conversation electronic device may cause 310 the audio clip "How are you" to be played by the user electronic device in conjunction with a visual representation of the corresponding character.

In certain embodiments, one or more visual elements that are displayed by a user electronic device may depend on the selected item of character information. For example, if one audio element is selected, the conversation electronic device may cause one or more visual elements to be displayed by the user electronic device. The visual elements may include one or more background images, character depictions, scenery changes, color changes and/or the like. For instance, if one audio element is selected, the conversation electronic device may cause a background to change to red, but if another audio element is selected, the conversation electronic device may cause the background to change to blue. As another example, if a selected audio element is humorous, the character may appear smiling or laughing. But if the selected audio is something sad, the character may appear sullen or crying. Additional and/or alternate visual elements may be used within the scope of this disclosure.

Referring back to FIG. 2, in response to presenting an item of character information, a user electronic device may receive 210 a response from a user. The response may include conversational information. Conversational information may be one or more spoken words, sentences, statements, questions, phrases, sounds, noises, music, and/or the like. In certain embodiments, conversational information may include silence or the lack of a response. A response may be received by one or more sensors, such as microphones, associated with the user electronic device. In certain embodiments, the response may be a written response, and may be received by a user electronic device via an input device such as a keyboard, a mouse, a touchscreen and/or the like.

The user electronic device may send 212 the response to the conversation electronic device. Referring back to FIG. 3, the conversation electronic device may receive 312 the response and may process 314 the response. In an embodiment, an embodier may hear the response, and may make another selection using the conversation atlas. For instance, referring to the above example, a user may respond "OK. How are you?" The embodier may in turn select the selection element "I'm great, thanks for asking!" 402e.

In other embodiments, a conversation electronic device may automatically process 314 the response. For example, a conversation electronic device may automatically determine an appropriate character response based on the response received from the user.

In various embodiments, the process described above may be repeated any number of times until a conversation is completed. An embodier may determine when a conversation should be completed. For instance, if the conversation has reached a natural end, an embodier may end the conversation. As another example, if a user is asking questions that are irrelevant to the media presentation, an embodier may end the conversation. A conversation may be ended according to additional and/or alternate situations according to various embodiments.

An embodier may end a conversation by selecting one or more selection elements from a conversation atlas that convey the conversation is over. For instance, an embodier may select a selection element associated with an audio element that causes a character to say "Thanks for your help! I gotta run." Additional and/or alternate selection elements may be used within the scope of this disclosure.

In certain embodiments, a conversation electronic device may end a conversation. For instance, if a script associated with a character and a conversation has been completed, a conversation electronic device may end a conversation. As another example, if an amount of time that a user has been conversing with a character exceeds a threshold, a conversation electronic device may end a conversation. A conversation electronic device may end a conversation in one or more alternate and/or additional ways.

A conversation electronic device may end a conversation by causing one or more audio elements and/or visual elements to be presented at a user electronic device. For instance, a conversation electronic device may cause an audio element to be presented at a user electronic device that says "I have to go, sorry!" Additional and/or alternate selection elements may be used within the scope of this disclosure. Once a conversation is completed, an interactive portion of a media presentation may be ended.

Referring back to FIG. 3, once an interactive portion has ended, a conversation electronic device may cause 316 the media presentation to return to a proper place in its sequence. In certain embodiments, the place in the media presentation where a user is returned to may depend on information received from a user electronic device during an interactive portion. For instance, during an interactive portion, a character may have become trapped in a certain location. There may be three different escape routes available to the character, Escape Route 1, Escape Route 2 and Escape Route 3. During the interactive portion, the character may have a conversation with a user about the best escape route to choose. The character may ask a user for the user's recommendation, and the user may suggest Escape Route 2. When the media presentation resumes after conclusion of the interactive portion, it may resume with the character following Escape Route 2 as suggested by the user. If the user had suggested Escape Route 1, the media presentation may resume with the character following Escape Route 1.

As another example, the ending of a media presentation may be dependent, at least in part, on information received during one or more interactive portions of a media presentation. As such, the progression or flow of a media presentation may be dependent, at least in part, on one or more user responses obtained during one or more interactive portions.

Figure 5:
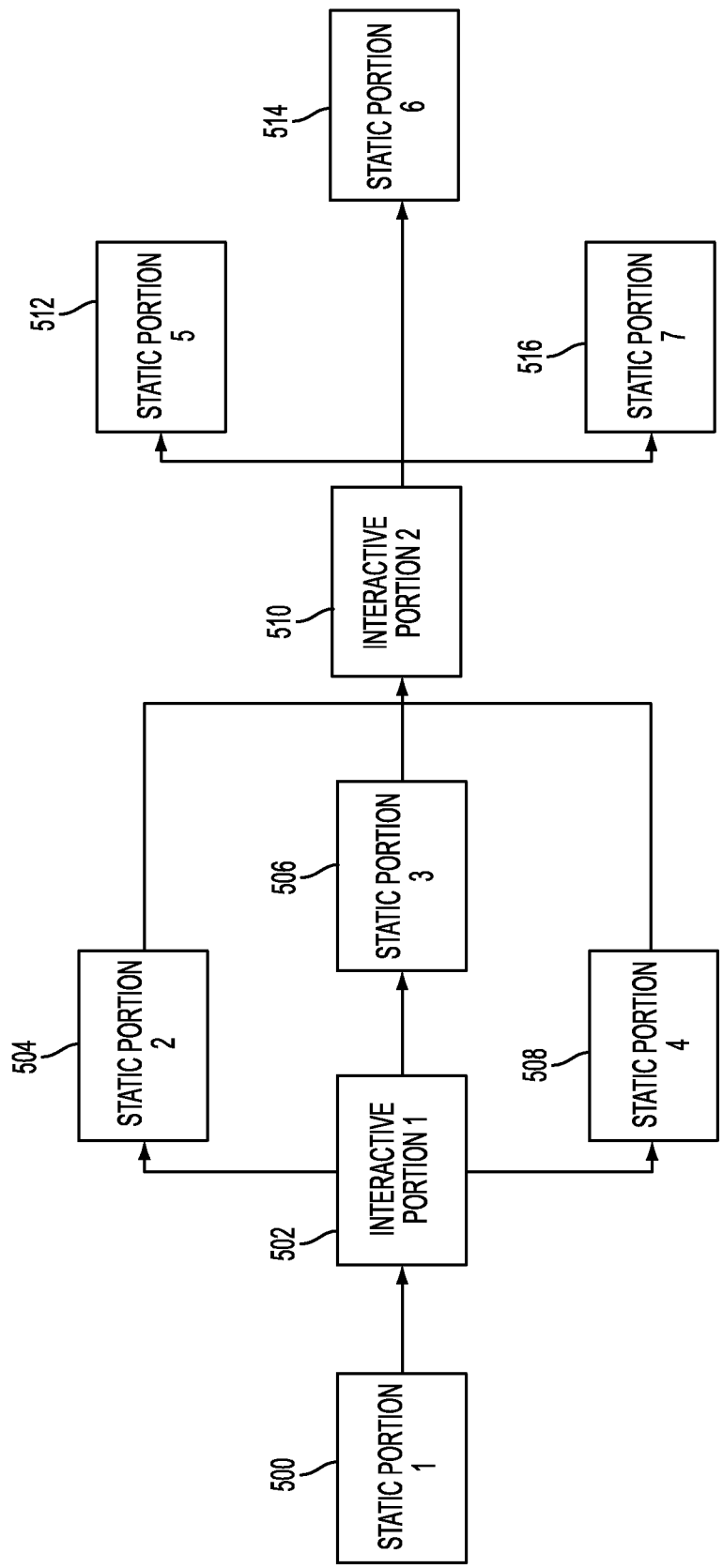
FIG. 5 illustrates an example media presentation flow according to an embodiment.

FIG. 5 illustrates an example media presentation flow according to an embodiment. As illustrated by FIG. 5, a media presentation may start with Static Portion 1 500, and may proceed to Interactive Portion 1 502. Depending on one or more user responses obtained during Interactive Portion 1 502, the media presentation may proceed to Static Portion 2 504, Static Portion 3 506 or Static Portion 4 508. From there, each path may progress to Interactive Portion 2 510. Depending on one or more user responses obtained during Interactive Portion 2 510, the media presentation may proceed to Static Portion 5 512 or Static Portion 6 514, and both paths may end at Static Portion 7 516.

In various embodiments, a media presentation may be accessed and/or controlled via the use of a software application. For example, an electronic device may download and install a software application. In certain embodiments, use of the software application may allow a user to control presentation of at least a portion of a media presentation at one or more electronic devices. For example, in some embodiments, a parent may be able to control the presentation of a media presentation on her child's tablet using her own tablet. An electronic device that controls presentation of a media presentation on another device is referred to as a controlling electronic device. An electronic device for which a media presentation is being controlled is referred to as a child electronic device. Examples of controlling electronic devices and/or a child electronic device may include, without limitation personal computers, televisions, gaming systems, mobile phones, smartphones, tablets and/or the like.

Figure 6:
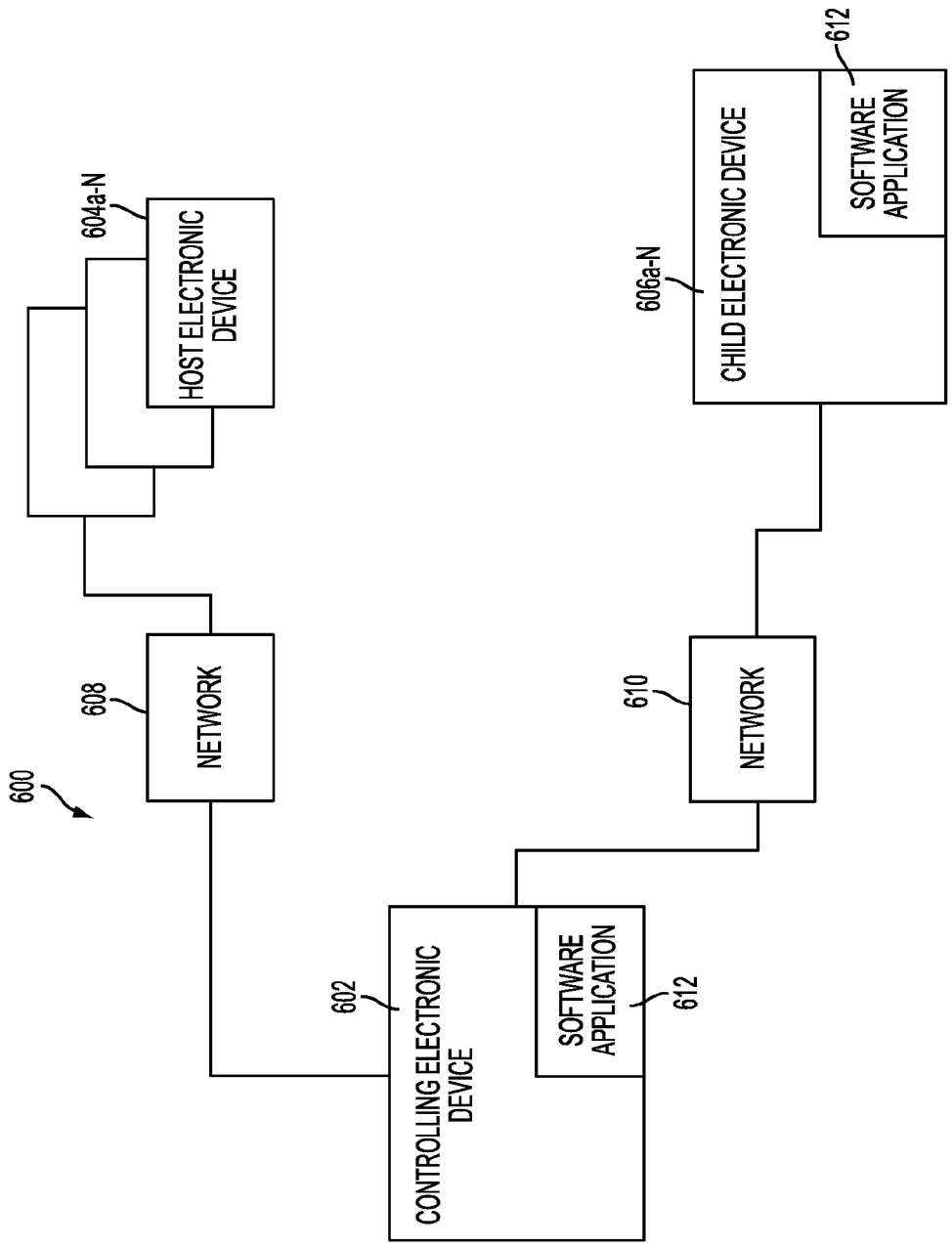
FIG. 6 illustrates an example interactive system according to an embodiment.

FIG. 6 illustrates an example interactive system according to an embodiment. As illustrated by FIG. 6, a system 600 may include a controlling electronic device 102, one or more host electronic devices 104*a*-N and one or more child electronic devices 106*a*-N. A controlling electronic device 102 and/or one or more child electronic devices 106*a*-N may include a software application 112.

A controlling electronic device 102 may be in communication with one or more of the host electronic devices 104*a*-N and/or the child electronic devices 106*a*-N via one or more networks 108, 110. A network 108, 110 may be a local area network (LAN), a wide area network (WAN), a mobile or cellular communication network, an extranet, an intranet, the Internet and/or the like.

In various embodiments, a controlling electronic device 602 may be used to access a media presentation from a host electronic device 604*a*-N. A controlling electronic device 602 may download a media presentation from a host electronic device 604*a*-N. In an alternate embodiment, a user electronic device 602 may stream or otherwise access a media presentation from a host electronic device 604*a*-N.

Figure 7:
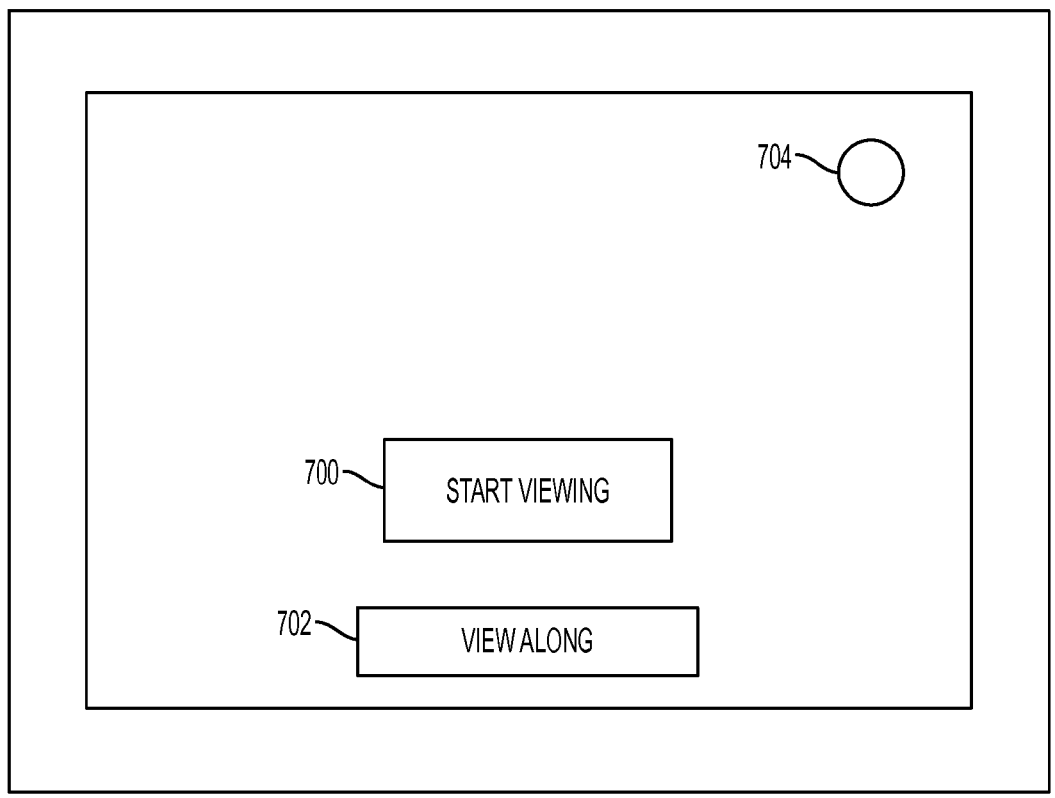
FIGS. 7-9 illustrate example graphical user interfaces of a software application that may be installed on an electronic device according to an embodiment.

FIG. 7 illustrates an example graphical user interface (GUI) of a software application that may be installed on an electronic device according to an embodiment. As illustrated by FIG. 7, a GUI may include a "Start Viewing" selection element 700, a "View Along" selection element 702 and a settings selection element 704. Additional and/or alternate selection elements may be used within the scope of this disclosure.

Figure 8:
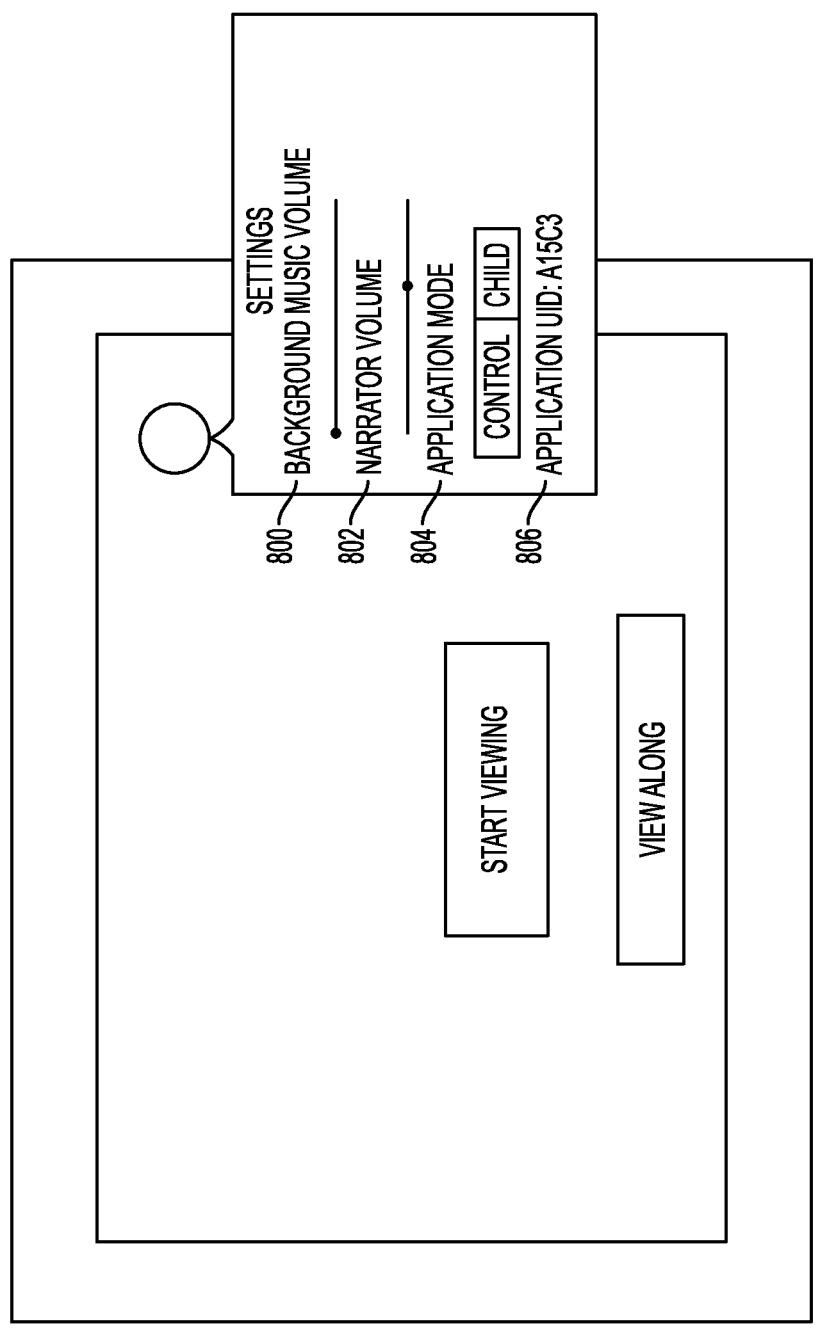

By selecting a settings selection element 704, a user may be able to control one or more settings associated with a media presentation. For example, as illustrated by FIG. 8, the background music volume 800, the narrator volume 802, and application mode 804 and/or other settings may be adjusted. An application mode may refer to a mode associated with the device on which the software application is installed. For example, if a "control" mode is selected, the electronic device may be used to control a media presentation on one or more other electronic devices. The application may be used as a controlling electronic device during "View Along" sessions with one or more other electronic devices, and may provide a user of the controlling electronic device the ability to initiate one or more "View Along" sessions with one or more other electronic device. By enabling this mode a user of the controlling electronic device may be considered an embodier of any "View Along" sessions the user establishes.

If a "child" mode is selected, presentation of a media presentation on the electronic device may be controlled, at least in part, by one or more other electronic devices, such as one or more controlling electronic devices. In an embodiment, an electronic device may not display the "View Along" selection element if child mode is selected so an application operating in child mode may not be able to initiate a "View Along" session.

Referring back to FIG. 8, an application GUI may display an application unique identifier (UID) 806. An application UID may be a unique identifier associated with the electronic device on which the application is being run.

In an embodiment, selection of the "Start Viewing" selection element 700 may initiate a "View Along" session with one or more electronic devices, during which a media may be presented at the electronic device. In an embodiment, selection of the "View Along" selection element 702 may allow two or more electronic devices to be synched to simultaneously present a media presentation to one or more viewers. For example, selection of a "View Along" selection element 702 may cause a GUI such as that illustrated in FIG. 9 to be displayed at an electronic device.

In an embodiment, an electronic device may identify one or more available electronic devices. An available electronic device may refer to an electronic device with which another electronic device may sync to view a media presentation. An electronic device may identify an available electronic device by identifying one or more electronic devices within range of the electronic device. In an embodiment, an electronic device may identify an available electronic device by identifying one or more electronic devices with which the electronic device has previously synched. In another embodiment, an electronic device may identify an available electronic device by identifying one or more electronic devices that have been registered.

In various embodiments, one or more electronic devices may be added to a list of available electronic devices. For instance, a user may select a selection element associated with adding an available electronic device. The electronic device may prompt the user to identify the available electronic device that the user would like to add. The user may provide an application UID associated with the electronic device to be added.

Figure 9:
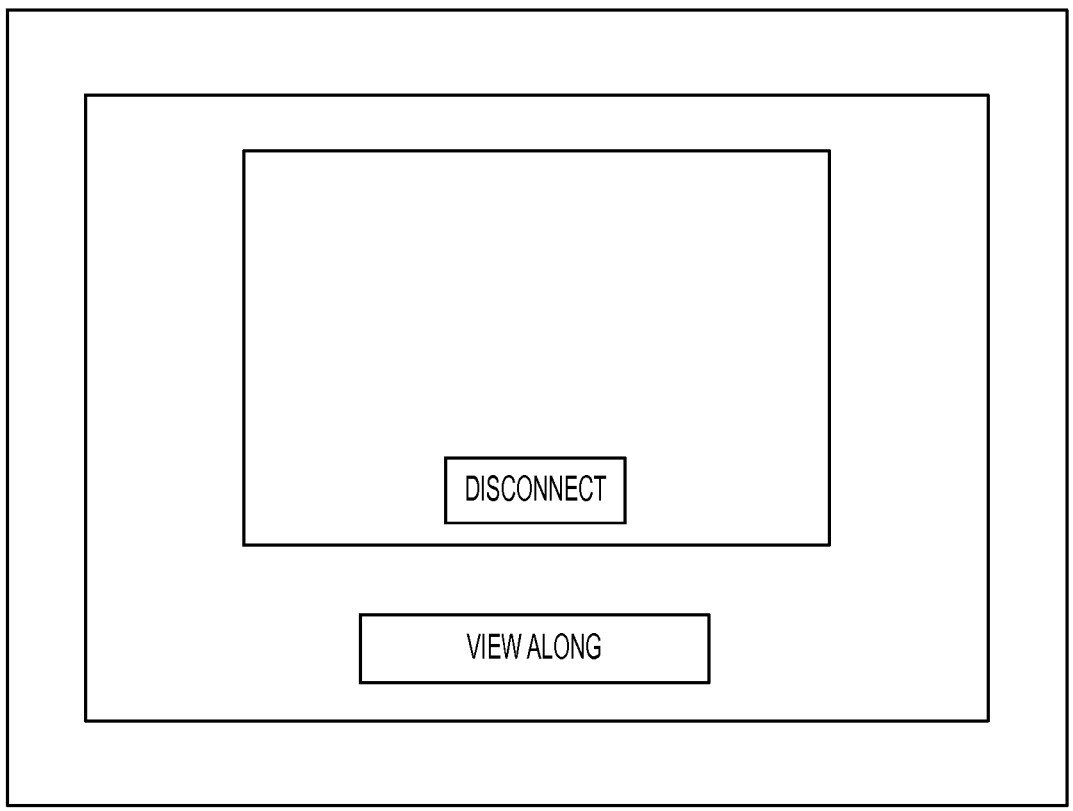

As illustrated by FIG. 9, a user may be able to select one or more available electronic devices to simultaneously present a media presentation. As shown in FIG. 9, a user may have the option of selecting Aidan's tablet or Noah's tablet. In certain embodiments, the user may be a parent and Aidan and Noah may be the parent's children. In other embodiments, the user may be a teacher or educator, and Aidan and Noah may be students. Additional and/or alternate relationships and/or electronic devices may exist according to this disclosure.

An available electronic device may be a child electronic device with which a controlling electronic device can establish a communication channel. As illustrated by FIG. 9, a user may have the ability to select a "Video" option and/or a "Sync" option for one or more available electronic devices.

Selecting the "Video" option may establish a video connection between a controlling electronic device and a corresponding child electronic device. For instance, selecting a "Video" option may cause a controlling electronic device to send a notification, such as, for example, a push notification, to a corresponding child electronic device. A notification may be displayed at the child electronic device. For instance, a notification "Your dad wants to read you a 'Bunnies and Rainbows' story in a video call. Would you like to accept?" may be displayed at the child electronic device with response choices such as "OK" or "Cancel." If a user of the child electronic device selects the OK choice, the child electronic device may launch a media presentation software application that is installed on the child electronic device, and may connect a video call with the father's electronic device.

Selecting a "Sync" option may cause a controlling electronic device to establish a connection between the controlling electronic device and one or more child electronic devices. In certain embodiments, this connection may allow a controlling electronic device to control one or more portions of a media presentation that is presented to a user of a child electronic device. Selecting a "Sync" option may cause a controlling electronic device to send a notification, such as, for example, a push notification, to a corresponding child electronic device. A notification may be displayed at the child electronic device. For instance, a notification "Your dad wants to read you a 'Bunnies and Rainbows' story. Would you like to accept?" may be displayed on child electronic device with response choices such as "OK" or "Cancel." If a user of the child electronic device selects the OK choice, the child electronic device may launch a media presentation software application that is installed on the child electronic device, and may establish a connection with the father's electronic device.

In certain embodiments, a user may select the "Video" option, and in other embodiments, a user may select the "Sync" option. For instance, if a user is located remotely from a child electronic device, the user may select the "Video" option. However, if the user is in the vicinity of the child electronic device such as, for example, in the same room, the user may choose to select the "Sync" option.

As illustrated by FIG. 9, a user may have the ability to add one or more child electronic devices, disconnect from one or more child electronic devices, edit a list of child electronic devices and/or the like.

Figure 10:
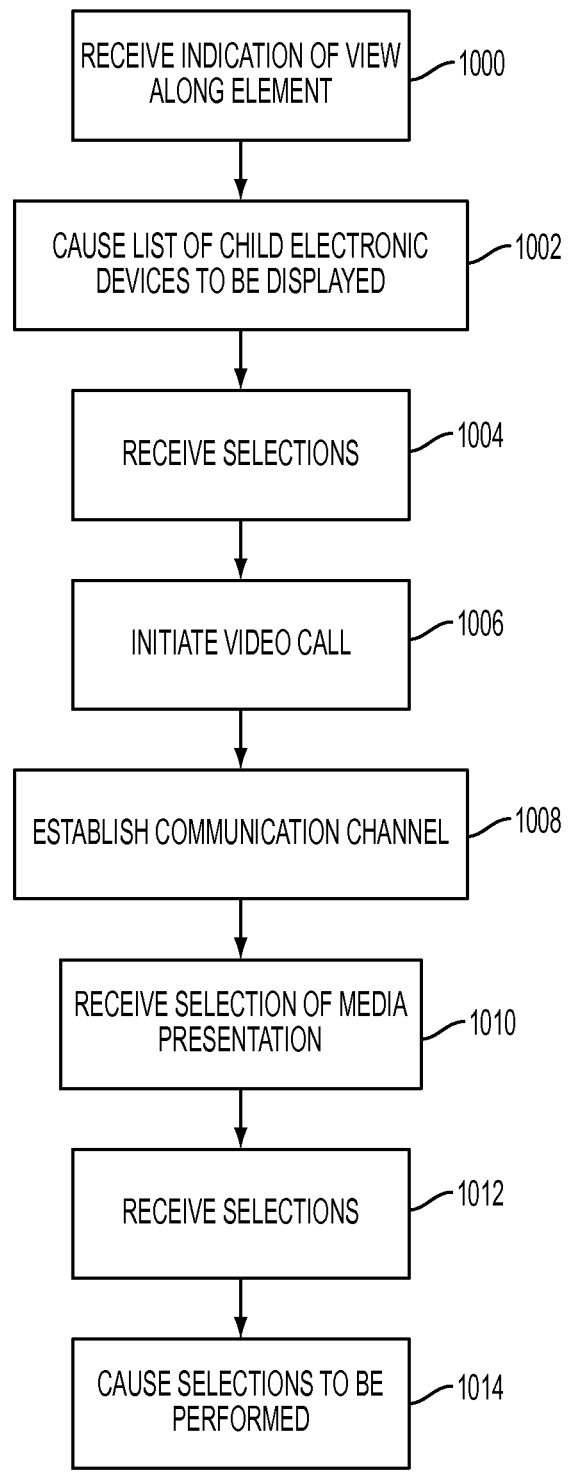
FIG. 10 illustrates an example method of providing a media presentation according to an embodiment.

FIG. 10 illustrates an example method of providing a media presentation according to an embodiment. As illustrated by FIG. 10, a user may select a "View Along" selection element using a controlling electronic device. The controlling electronic device may receive 1000 an indication of the selection of the "View Along" selection element, and may cause 1002 a list of available child electronic devices to be displayed. Referring back to the above example, the user may select the "Video" option associated with his son Aidan's tablet, and the user's tablet may receive 1004 the selection. In response, the controlling electronic device may initiate 1006 a video call with the selected child electronic device. The controlling electronic device may also establish 1008 a communication channel with the selected child electronic device. In certain embodiments, a user of a child electronic device may accept the video call and/or the request to initiate a communication channel in order to establish a video communication and/or a communication channel with a controlling electronic device.

In various embodiments, a video call may allow a user of a controlling electronic device to talk in real time with a user of a child electronic device during the presentation of a media presentation. For instance, a parent may want to read his son a bedtime story in the form of a media presentation while he is traveling. The parent may establish a video connection with his son's electronic device so that he and his son can see and hear one another during presentation of the media presentation.

In an embodiment, a user may select a media presentation to view, and a controlling electronic device may receive 1010 this selection. The media presentation may be presented on both the controlling electronic device and on the selected child electronic device. In certain embodiments, a conversation atlas associated with the selected media presentation may be displayed on the controlling electronic device.

Figure 11A:
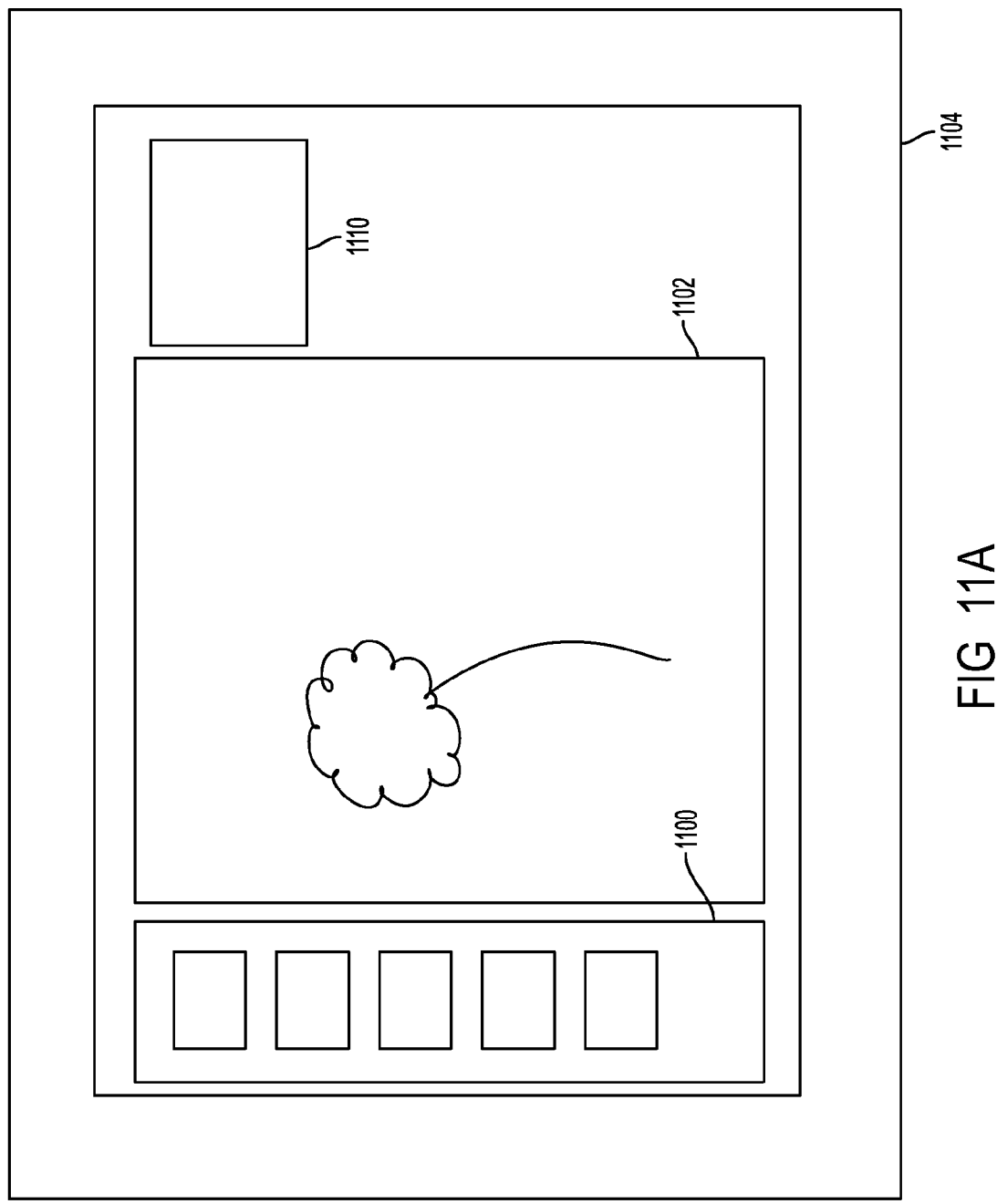
FIG. 11A illustrates an example representation of a controlling electronic device according to an embodiment.
Figure 11B:
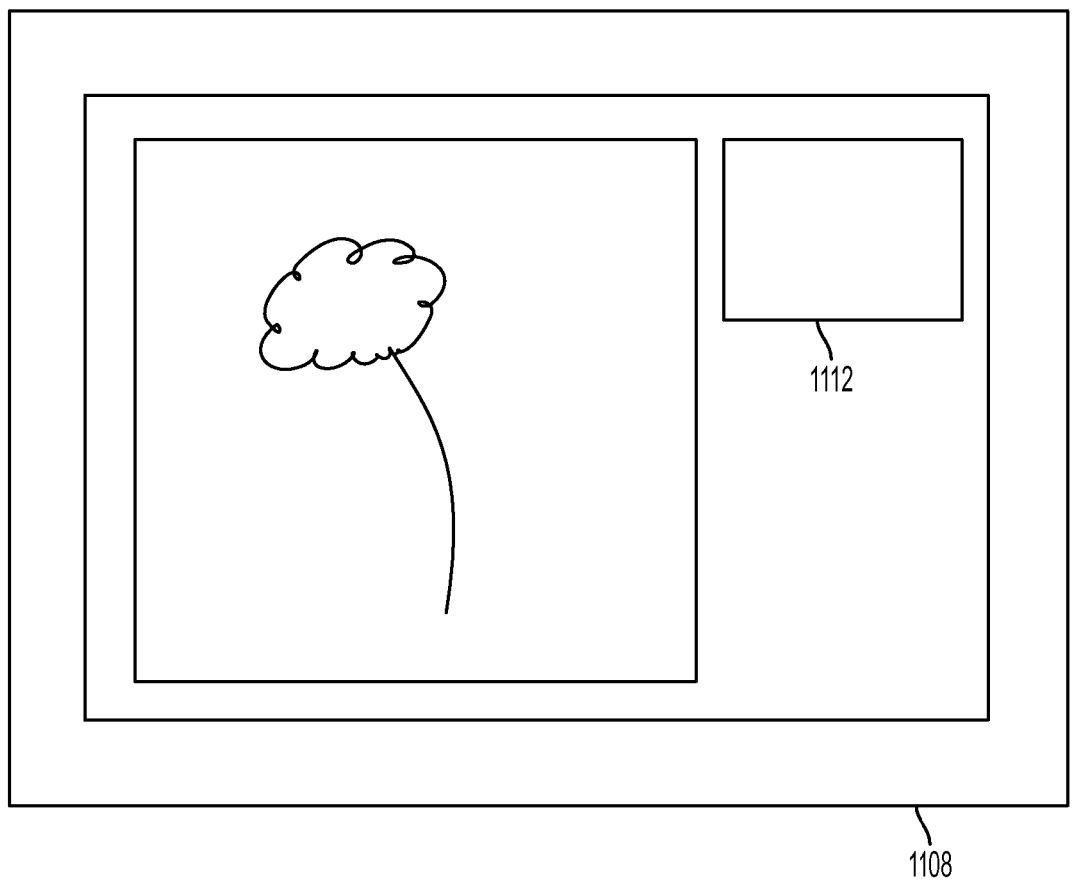
FIG. 11B illustrates an example representation of a child electronic device according to an embodiment.

FIG. 11A illustrates an example representation of a controlling electronic device and FIG. 11B illustrates an example representation of a child electronic device according to an embodiment. As illustrated by FIG. 11A, a conversation atlas 1100 may be displayed on at least a portion of the display of the controlling electronic device 1104, and a portion of a media presentation 1102 may be displayed on another portion of the display of the controlling electronic device. However, only the portion of the media presentation 1102 that is displayed on the controlling electronic device may be displayed on the child electronic device 1108 as illustrated by FIG. 11B. In certain embodiments, if video chat has been established, a video chat window 1110, 1112 may be displayed on the controlling electronic device and the child electronic device.

In various embodiments, a user may make one or more control selections with respect to the media presentation, and these selections may be received 1012 by the controlling electronic device. A control selection may refer to a selection that is related to how a media presentation is presented. Example control selections may include, without limitation, advancing a media presentation, rewinding or backtracking in a media presentation, changing a volume setting associated with the media presentation, changing a color scale, resolution or other display setting associated with the media presentation and/or the like.

The controlling electronic device may cause 1014 one or more selections to be performed by the child electronic device. For instance, the user may cause the media presentation to progress by selecting a next page, a next frame, a next scene and/or the like. The media presentation may similarly progress on the child electronic device.

In an embodiment, a controlling electronic device may enable a conversation atlas during one or more interactive portions of a media presentation. For example, when an interactive portion of a media presentation is reached, a user of a controlling electronic device may select one or more selection elements of the conversation atlas. As described above, the selection elements may correspond to character information. In various embodiments, a user may select one or more selection elements of a conversation atlas during an interactive portion of a media presentation to allow a user of the child electronic device to have a conversation with one or more characters of the media presentation. In this way, the user of the controlling electronic device may be considered an embodier as discussed above.

In other embodiments, a controlling electronic device may enable a conversation during one or more non-interactive portions of a media presentation. For example, a user may select one or more selection elements of a conversation atlas at any time during presentation of a media presentation. For instance, if a child would like to hear a certain audio element, such as a sound, a song or the like, the user may select a corresponding selection element to play the audio element. The controlling electronic device may receive the selections and may cause one or more audio and/or visual elements associated with the selected selection elements to be performed at the controlling electronic device and/or the child electronic device.

By way of example, a dad may want to read his daughter a bedtime story in the form of a media presentation while the dad is traveling. Both the dad and the daughter may have their own tablets with a media presentation software application installed on each.

The dad may open the application, select a "View Along" button and select his daughter's tablet from a list of available devices. He may select a "Video" and a "Sync" option to establish a connection with his daughter's tablet. The dad may select a particular media presentation to view. In certain embodiments, he may select a media presentation from a library of downloaded media presentations, such as those that may be stored on the dad's tablet. In other embodiments, he may select a media presentation from a software application, a website and/or the like, and the media presentation may be streamed.

Once communication is established with his daughter's tablet, the dad may begin a media presentation. The dad's tablet display may include a conversation atlas portion and a media presentation portion. The conversation atlas portion may include one or more selection elements corresponding to the media presentation. These selection elements may correspond to one or more audio elements, visual elements and/or the like. The dad may select one or more selection elements from the conversation atlas during the media presentation, and the corresponding information may be presented at the dad's tablet and/or the daughter's tablet. For instance, the media presentation may be a story about bears. At a certain point in the media presentation, the dad may select a selection element that is associated with an audio clip of a bear growling. The audio clip may be played at the dad's tablet and/or the daughter's tablet.

The dad may select one or more selection elements during an interactive portion of a media presentation to allow his daughter to have a conversation with one or more characters in the media presentation, as discussed in more detail above. The dad may select one or more selection elements at any time during a media presentation to cause an audio element and/or a visual element to be performed at his daughter's tablet.

In certain embodiments, the dad may select one or more selection elements for controlling the media presentation. For instance, the dad may select a selection element to pause, rewind or advance the media presentation. The changes that are made by the dad to the media presentation on the dad's tablet may also be reflected on the media presentation of the daughter's tablet. For example, if the dad advances the media presentation to a next page on his tablet, the media presentation displayed at the daughter's tablet may also be advanced.

As another example, a teacher may want to play an educational media presentation for each of her ten students. The teacher may have a tablet, and each student may have their own tablet with a media presentation software application installed on each.

The teacher may open the application, select a "View Along" button and select her students' tablets from a list of available devices. If the teacher is in the same classroom as the ten students, she may select the "Sync" option to establish communication with her students' tablets. In remote learning situations where the teacher is not in the same location as her students, the teacher may select the "Video" option as well.

The teacher may select a particular media presentation to view, and once communication is established with her students' tablets, the teacher may begin a media presentation. The teacher may select one or more selection elements from the conversation atlas during the media presentation, and the corresponding information may be presented at the teacher's tablet and/or the students' tablets.

In certain embodiments, the teacher may select one or more selection elements for controlling the media presentation. For instance, the teacher may select a selection element to pause, rewind or advance the media presentation. The changes that are made by the teacher to the media presentation on the teacher's tablet may also be reflected on the media presentation of the students' tablets. For example, if the teacher advances the media presentation to a next page on his tablet, the media presentation displayed at each student's tablet may also be advanced.

Figure 12:
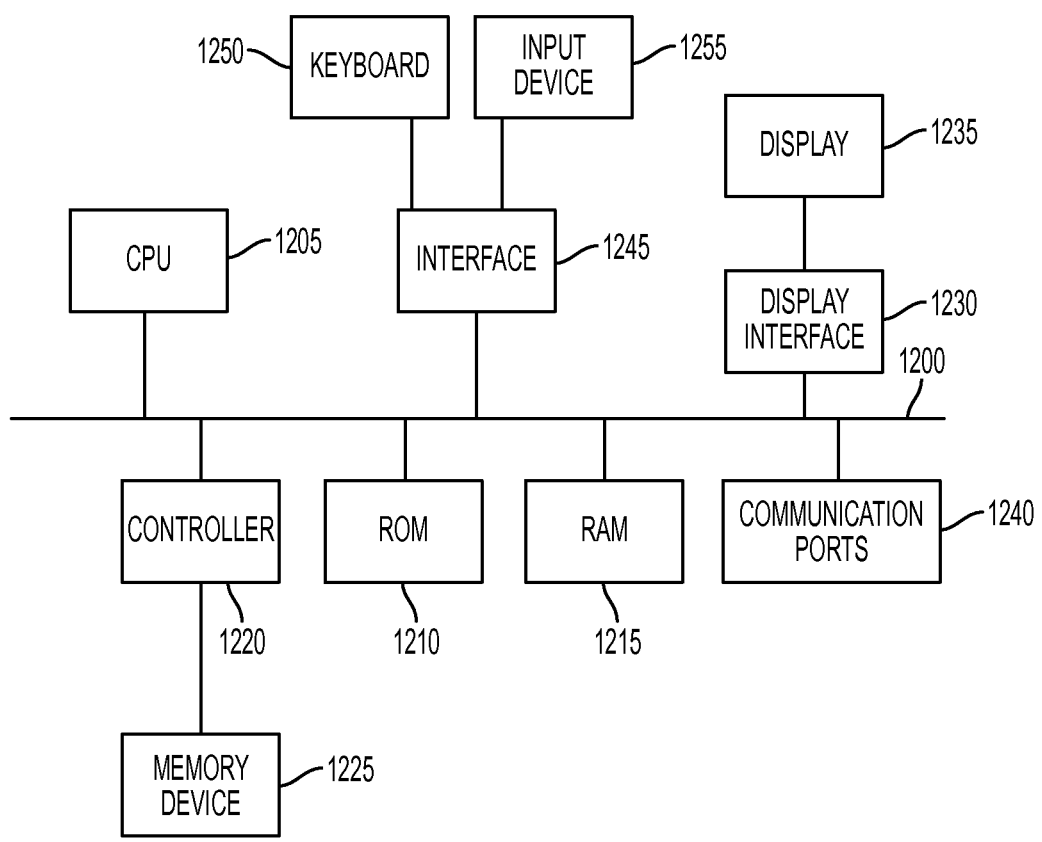
FIG. 12 illustrates a block diagram of example hardware that may be used to contain or implement program instructions according to an embodiment.

FIG. 12 depicts a block diagram of hardware that may be used to contain or implement program instructions. A bus 1200 serves as the main information highway interconnecting the other illustrated components of the hardware. CPU 1205 is the central processing unit of the system, performing calculations and logic operations required to execute a program. CPU 1205, alone or in conjunction with one or more of the other elements disclosed in FIG. 12, is an example of an electronic device or processor as such terms are used within this disclosure. Read only memory (ROM) 1210 and random access memory (RAM) 1215 constitute examples of non-transitory computer-readable storage media.

A controller 1220 interfaces with one or more optional non-transitory computer-readable storage media 1225 to the system bus 1200. These storage media 1225 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1210 and/or the RAM 1215. Optionally, the program instructions may be stored on a tangible, non-transitory computer-readable medium such as a compact disk, a digital disk, flash memory, a memory card, a USB drive, an optical disc storage medium and/or other recording medium.

An optional display interface 1230 may permit information from the bus 1200 to be displayed on the display 1235 in audio, visual, graphic or alphanumeric format. Communication with external devices, such as a printing device, may occur using various communication ports 1240. A communication port 1240 may be attached to a communication network, such as the Internet or an intranet.

The hardware may also include an interface 1245 which allows for receipt of data from input devices such as a keyboard 1250 or other input device 1255 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of providing an interactive media presentation, the method comprising:
   by an electronic device associated with an embodier:
      receiving, from a user electronic device in communication with the electronic device, an indication that an interactive portion of a media presentation is about to begin;
      causing a graphical representation of a conversation atlas to be displayed to the embodier via a display device of the electronic device, wherein the conversation atlas comprises a plurality of selection elements that are each associated with an audio element for a character that is featured in the interactive portion, wherein the graphical representation of the conversation atlas is not displayed at the user electronic device;
      receiving, from the user electronic device, a user response comprising conversational information received from a user that is directed to a character of the media presentation;
      in response to receiving the user response, receiving, from the embodier, a selection of at least one of the plurality of selection elements of the conversation atlas;
      identifying the audio element that corresponds to the selected selection element; and
      causing the identified audio element to be presented at the user electronic device.

2. The method of claim 1, wherein receiving an indication that an interactive portion of a media presentation is about to begin comprises receiving an identifier associated with the interactive portion.

3. The method of claim 2, further comprising using the identifier to identify the conversation atlas, wherein the conversation atlas is associated with the interactive portion and the character.

4. The method of claim 1, wherein receiving a user response comprises receiving a user request comprising one or more of the following spoken information:
   one or more questions;
   one or more statements; and
   one or more sounds.

5. The method of claim 1, wherein receiving a selection of at least one of the plurality of selection elements comprises receiving a selection of at least one of the plurality of selection elements that is responsive to the received user response.

6. The method of claim 1, wherein identifying the audio element corresponding to the selected selection element comprises retrieving the audio element from a conversation atlas database, wherein the audio element comprises one or more sounds in the character's voice.

7. The method of claim 1, wherein causing the identified audio element to be presented at the user electronic device in a voice of the character comprises causing the identified audio element to be presented in conjunction with a graphical representation of the character such that it appears that the graphical representation of the character is speaking a content of the audio element.

8. The method of claim 1, wherein causing the identified audio element to be presented at the user electronic device in a voice of the character comprises causing one or more features of a graphical representation of the character to change based on the identified audio element.

9. The method of claim 1, further comprising repeating receiving a user response, receiving a selection of at least one of the plurality of selection elements of the conversation atlas, identifying the audio element that corresponds to the selected selection element, and causing the identified audio element to be played at the user electronic device until the interactive portion concludes.

10. The method of claim 1, further comprising:
    determining that the interactive portion has concluded;
    in response to determining that the interactive portion has concluded, resuming a flow of the media presentation by:
       identifying a static portion of the media presentation, and
       causing the identified static portion to be performed at the user electronic device.

11. The method of claim 10, wherein identifying a static portion of the media presentation comprises identifying a static portion of the media presentation from a plurality of possible static portions based, at least in part, on the user response.

12. A system of providing an interactive media presentation, the system comprising:
    a user electronic device associated with a user;
    an electronic device associated with an embodier, wherein the electronic device is in communication with the user electronic device; and
    a computer-readable storage medium in communication with the electronic device, wherein the computer-readable storage medium comprises one or more programming instructions that when executed, cause the electronic device to:
       receive, from the user electronic device, an indication that an interactive portion of a media presentation is about to begin,
       cause a graphical representation of a conversation atlas to be displayed to the embodier via a display device of the electronic device, wherein the conversation atlas comprises a plurality of selection elements that are each associated with an audio element for a character that is featured in the interactive portion,
       receive, from the user electronic device, a user response, wherein the user response comprises conversational information received from a user wherein the conversational information is directed to a character of the media presentation,
       in response to receiving the user response, receive, from the embodier, a selection of at least one of the plurality of selection elements of the conversation atlas, identify the audio element that corresponds to the selected selection element; and cause the identified audio element to be performed at the user electronic device, wherein the user electronic device does not display the graphical representation of the conversation atlas.

13. The system of claim 12, wherein the one or more programming instructions that, when executed, cause the electronic device to receive an indication that an interactive portion of a media presentation is about to begin comprise one or more programming instructions that, when executed, cause the electronic device to receive an identifier associated with the interactive portion.

14. The system of claim 13, wherein the computer-readable storage medium further comprises one or more programming instructions that, when executed, cause the electronic device to use the identifier to identify the conversation atlas, wherein the conversation atlas is associated with the interactive portion and the character.

15. The system of claim 12, wherein the one or more programming instructions that, when executed, cause the electronic device to receive a user response comprise one or more programming instructions that, when executed, cause the electronic device to receive a user request comprising one or more of the following spoken information:
  one or more questions;
  one or more statements; and
  one or more sounds.

16. The system of claim 12, wherein the one or more programming instructions that, when executed, cause the electronic device to receive a selection of at least one of the plurality of selection elements comprise one or more programming instructions that, when executed, cause the electronic device to receive a selection of at least one of the plurality of selection elements that is responsive to the received user response.

17. The system of claim 12, wherein the one or more programming instructions that, when executed, cause the electronic device to identify the audio element corresponding to the selected selection element comprise one or more programming instructions that, when executed, cause the electronic device to retrieve the audio element from a conversation atlas database, wherein the audio element comprises one or more sounds in the character's voice.

18. The system of claim 12, wherein the one or more programming instructions that, when executed, cause the electronic device to cause the identified audio element to be performed at the user electronic device in a voice of the character comprise one or more programming instructions that, when executed, cause the electronic device to cause the identified audio element to be performed in conjunction with a graphical representation of the character such that it appears that the graphical representation of the character is speaking a content of the audio element.

19. The system of claim 12, wherein the one or more programming instructions that, when executed, cause the electronic device to cause the identified audio element to be performed at the user electronic device in a voice of the character comprise one or more programming instructions that, when executed, cause the electronic device to cause one or more features of a graphical representation of the character to change based on the identified audio element.

20. The system of claim 12, wherein the computer-readable storage medium further comprises one or more programming instructions that, when executed, cause the electronic device to:
  determine that the interactive portion has concluded;
  in response to determining that the interactive portion has concluded, resume a flow of the media presentation by:
    identifying a static portion of the media presentation, and
    causing the identified static portion to be performed at the user electronic device.

21. The system of claim 20, wherein the one or more programming instructions that, when executed, cause the electronic device to identify a static portion of the media presentation comprise one or more programming instructions that, when executed, cause the electronic device to identify a static portion of the media presentation from a plurality of possible static portions based, at least in part, on the user response.

* * * * *